US008665075B2

(12) United States Patent
Pratt et al.

(10) Patent No.: US 8,665,075 B2
(45) Date of Patent: Mar. 4, 2014

(54) GESTURE-INITIATED REMOTE CONTROL PROGRAMMING

(75) Inventors: James Pratt, Round Rock, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 504 days.

(21) Appl. No.: 12/606,053

(22) Filed: Oct. 26, 2009

(65) Prior Publication Data

US 2011/0095873 A1    Apr. 28, 2011

(51) Int. Cl.
| G05B 11/01 | (2006.01) |
| G08B 6/00 | (2006.01) |
| G05B 23/02 | (2006.01) |
| G08C 19/16 | (2006.01) |
| G09G 5/08 | (2006.01) |
| G09G 5/00 | (2006.01) |
| G06F 3/041 | (2006.01) |
| G06F 3/042 | (2006.01) |
| G10L 21/00 | (2013.01) |
| G10L 25/00 | (2013.01) |

(52) U.S. Cl.
USPC ..... 340/12.28; 340/407.2; 340/3.1; 340/12.1; 345/158; 345/156; 345/173; 345/176; 704/275; 704/277

(58) Field of Classification Search
USPC .............. 340/3.1, 12.78, 5.1, 825.22, 825.25, 340/825.69, 825.24, 825.71, 539.16, 340/539.19, 541, 567, 10.1; 345/156, 157, 345/121, 123, 127, 341, 339, 159, 173, 345/158; 382/288, 115, 118, 181, 203; 348/211.1, 211.99, 734, 77
See application file for complete search history.

(56) References Cited

U.S. PATENT DOCUMENTS

| 6,484,027 | B1 | 11/2002 | Mauney et al. |
| 6,603,420 | B1 * | 8/2003 | Lu .................................. 341/176 |
| 6,865,372 | B2 | 3/2005 | Mauney et al. |
| 7,010,169 | B2 | 3/2006 | Kortum et al. |
| 7,016,709 | B2 | 3/2006 | Kortum et al. |
| 7,155,305 | B2 | 12/2006 | Hayes et al. |
| 7,206,614 | B2 | 4/2007 | Kortum et al. |
| 7,251,373 | B2 | 7/2007 | Kortum et al. |
| D550,696 | S | 9/2007 | Kortum et al. |
| 7,307,574 | B2 | 12/2007 | Kortum et al. |
| D562,806 | S | 2/2008 | Bruce et al. |
| 7,337,220 | B2 | 2/2008 | Kortum et al. |
| 7,353,018 | B2 | 4/2008 | Mauney et al. |
| 7,366,337 | B2 | 4/2008 | Kortum et al. |
| 7,379,778 | B2 | 5/2008 | Hayes et al. |
| 7,403,793 | B2 | 7/2008 | Mauney et al. |
| 7,406,207 | B2 | 7/2008 | Kortum et al. |
| 7,474,359 | B2 | 1/2009 | Sullivan et al. |
| 7,499,594 | B2 | 3/2009 | Kortum et al. |
| 7,512,228 | B2 | 3/2009 | Kortum et al. |
| 7,518,991 | B2 | 4/2009 | Sullivan et al. |

(Continued)

*Primary Examiner* — Jennifer Mehmood
*Assistant Examiner* — Mirza Alam
(74) *Attorney, Agent, or Firm* — Jackson Walker L.L.P.

(57) ABSTRACT

A method and system for configuring a universal remote control (URC) to control a remote-controlled device includes establishing a communication link between the URC and the remote-controlled device in response to detecting a gesture motion of the URC. Device information may be received from the remote-controlled device and used by the URC to program the URC to control the remote-controlled device. The URC may be configured to control a plurality of remote-controlled devices. The communication link may be a near field wireless communication link.

17 Claims, 5 Drawing Sheets

(56) References Cited

U.S. PATENT DOCUMENTS

| | | |
|---|---|---|
| 7,519,537 B2 | 4/2009 | Rosenberg |
| 7,542,816 B2 | 6/2009 | Rosenberg |
| 7,551,973 B2 | 6/2009 | Cansler, Jr. et al. |
| 7,565,430 B2 | 7/2009 | Kortum et al. |
| 7,586,032 B2 | 9/2009 | Louis |
| 7,602,898 B2 | 10/2009 | Klein et al. |
| D603,842 S | 11/2009 | Bruce et al. |
| 7,636,933 B2 | 12/2009 | Kortum et al. |
| 7,693,542 B2 | 4/2010 | Mauney et al. |
| 7,716,714 B2 | 5/2010 | Kortum et al. |
| 7,774,384 B2 | 8/2010 | Kortum et al. |
| 7,783,120 B2 | 8/2010 | Kortum et al. |
| 7,793,317 B2 | 9/2010 | Sullivan et al. |
| 7,821,499 B2 | 10/2010 | Gates et al. |
| 7,873,102 B2 | 1/2011 | Van Vleck et al. |
| 7,876,232 B2 | 1/2011 | Sullivan et al. |
| 7,876,775 B2 | 1/2011 | Jones et al. |
| 7,877,705 B2 | 1/2011 | Chambers et al. |
| 7,885,684 B2 | 2/2011 | Mauney et al. |
| 7,894,682 B2 | 2/2011 | Kortum et al. |
| 7,949,305 B2 | 5/2011 | Sullivan et al. |
| 7,952,063 B2 | 5/2011 | Peters |
| 7,966,310 B2 | 6/2011 | Sullivan et al. |
| 2001/0035860 A1* | 11/2001 | Segal et al. ............ 345/173 |
| 2002/0037715 A1 | 3/2002 | Mauney et al. |
| 2003/0079028 A1 | 4/2003 | Kortum et al. |
| 2003/0194141 A1 | 10/2003 | Kortum et al. |
| 2003/0194142 A1 | 10/2003 | Kortum et al. |
| 2004/0116073 A1 | 6/2004 | Mauney et al. |
| 2005/0020236 A1 | 1/2005 | Mauney et al. |
| 2005/0032475 A1 | 2/2005 | Mauney et al. |
| 2005/0076121 A1 | 4/2005 | Kortum et al. |
| 2005/0134578 A1 | 6/2005 | Chambers et al. |
| 2005/0159107 A1 | 7/2005 | Mauney et al. |
| 2005/0166261 A1 | 7/2005 | Kortum et al. |
| 2005/0175230 A1 | 8/2005 | Kortum et al. |
| 2005/0180463 A1 | 8/2005 | Jones et al. |
| 2005/0180560 A1 | 8/2005 | Kortum et al. |
| 2005/0195099 A1* | 9/2005 | Vidal ............ 341/176 |
| 2005/0202854 A1 | 9/2005 | Kortum et al. |
| 2005/0212767 A1* | 9/2005 | Marvit et al. ............ 345/158 |
| 2005/0216589 A1 | 9/2005 | Kortum et al. |
| 2006/0015924 A1 | 1/2006 | Kortum et al. |
| 2006/0026663 A1 | 2/2006 | Kortum et al. |
| 2006/0037043 A1 | 2/2006 | Kortum et al. |
| 2006/0037083 A1 | 2/2006 | Kortum et al. |
| 2006/0039547 A1 | 2/2006 | Klein et al. |
| 2006/0048178 A1 | 3/2006 | Kortum et al. |
| 2006/0048179 A1 | 3/2006 | Kortum et al. |
| 2006/0050865 A1 | 3/2006 | Kortum et al. |
| 2006/0087978 A1 | 4/2006 | Sullivan et al. |
| 2006/0098882 A1 | 5/2006 | Kortum et al. |
| 2006/0112094 A1 | 5/2006 | Sullivan et al. |
| 2006/0114360 A1 | 6/2006 | Kortum et al. |
| 2006/0116177 A1 | 6/2006 | Kortum et al. |
| 2006/0117374 A1 | 6/2006 | Kortum et al. |
| 2006/0123445 A1 | 6/2006 | Sullivan et al. |
| 2006/0126808 A1 | 6/2006 | Dallessandro et al. |
| 2006/0156372 A1 | 7/2006 | Cansler, Jr. et al. |
| 2006/0159119 A1 | 7/2006 | Kortum et al. |
| 2006/0161690 A1 | 7/2006 | Kavanagh et al. |
| 2006/0168610 A1 | 7/2006 | Noil Williams et al. |
| 2006/0170582 A1 | 8/2006 | Kortum et al. |
| 2006/0174279 A1 | 8/2006 | Sullivan et al. |
| 2006/0184992 A1 | 8/2006 | Kortum et al. |
| 2006/0187071 A1 | 8/2006 | Kortum et al. |
| 2006/0259184 A1 | 11/2006 | Hayes et al. |
| 2006/0271516 A1 | 11/2006 | Kortum et al. |
| 2007/0011250 A1 | 1/2007 | Kortum et al. |
| 2007/0025449 A1 | 2/2007 | Van Vleck et al. |
| 2007/0039031 A1 | 2/2007 | Cansler, Jr. et al. |
| 2007/0039036 A1 | 2/2007 | Sullivan et al. |
| 2007/0044119 A1 | 2/2007 | Sullivan et al. |
| 2007/0056015 A1 | 3/2007 | Kortum et al. |
| 2007/0130588 A1 | 6/2007 | Edwards et al. |
| 2007/0143790 A1 | 6/2007 | Williams et al. |
| 2007/0169155 A1 | 7/2007 | Pasquale et al. |
| 2007/0174276 A1 | 7/2007 | Sullivan et al. |
| 2007/0177188 A1 | 8/2007 | Wollmershauser et al. |
| 2007/0180382 A1 | 8/2007 | Kortum et al. |
| 2007/0180489 A1 | 8/2007 | Joseph et al. |
| 2007/0192791 A1 | 8/2007 | Sullivan et al. |
| 2007/0248273 A1 | 10/2007 | Kortum et al. |
| 2007/0271342 A1 | 11/2007 | Brandt et al. |
| 2007/0294737 A1 | 12/2007 | Edwards et al. |
| 2008/0016468 A1 | 1/2008 | Chambers et al. |
| 2008/0098308 A1 | 4/2008 | Kortum et al. |
| 2008/0100492 A1 | 5/2008 | Kortum et al. |
| 2008/0101338 A1 | 5/2008 | Reynolds et al. |
| 2008/0101588 A1 | 5/2008 | Bruce et al. |
| 2008/0104630 A1 | 5/2008 | Bruce et al. |
| 2008/0109839 A1 | 5/2008 | Bruce et al. |
| 2008/0125098 A1 | 5/2008 | Bruce et al. |
| 2008/0165283 A1 | 7/2008 | Brandt et al. |
| 2008/0187210 A1 | 8/2008 | Kortum et al. |
| 2008/0188959 A1 | 8/2008 | Kneissler |
| 2008/0189736 A1 | 8/2008 | Edwards et al. |
| 2008/0235745 A1 | 9/2008 | Edwards et al. |
| 2008/0250468 A1 | 10/2008 | Sullivan et al. |
| 2008/0261514 A1 | 10/2008 | Pratt et al. |
| 2009/0010555 A1 | 1/2009 | Kortum et al. |
| 2009/0021651 A1 | 1/2009 | Pratt et al. |
| 2009/0031375 A1 | 1/2009 | Sullivan et al. |
| 2009/0044233 A1 | 2/2009 | Brandt et al. |
| 2009/0067591 A1 | 3/2009 | Belz et al. |
| 2009/0073321 A1 | 3/2009 | Sullivan et al. |
| 2009/0094654 A1 | 4/2009 | Sullivan et al. |
| 2009/0096633 A1* | 4/2009 | Kim et al. ............ 340/825.22 |
| 2009/0102800 A1 | 4/2009 | Keenan |
| 2009/0109050 A1 | 4/2009 | Sullivan et al. |
| 2009/0111656 A1 | 4/2009 | Sullivan et al. |
| 2009/0115904 A1 | 5/2009 | Sullivan et al. |
| 2009/0119181 A1 | 5/2009 | Pratt et al. |
| 2009/0122146 A1 | 5/2009 | Zalewski et al. |
| 2009/0125971 A1 | 5/2009 | Belz et al. |
| 2009/0153288 A1* | 6/2009 | Hope et al. ............ 340/3.1 |
| 2009/0156251 A1 | 6/2009 | Cannistraro et al. |
| 2009/0157473 A1 | 6/2009 | Belz et al. |
| 2009/0158369 A1 | 6/2009 | Van Vleck et al. |
| 2009/0158373 A1 | 6/2009 | Belz et al. |
| 2009/0161532 A1 | 6/2009 | Sullivan et al. |
| 2009/0180377 A1 | 7/2009 | Sullivan et al. |
| 2009/0180596 A1 | 7/2009 | Reynolds et al. |
| 2009/0185748 A1 | 7/2009 | Kortum et al. |
| 2009/0187955 A1 | 7/2009 | Sullivan et al. |
| 2009/0222868 A1 | 9/2009 | Reynolds et al. |
| 2009/0245494 A1 | 10/2009 | Sullivan et al. |
| 2009/0249429 A1 | 10/2009 | Sullivan et al. |
| 2009/0288115 A1 | 11/2009 | Belz et al. |
| 2009/0312059 A1 | 12/2009 | Pratt et al. |
| 2009/0319607 A1 | 12/2009 | Belz et al. |
| 2010/0039214 A1 | 2/2010 | Pratt et al. |
| 2010/0039392 A1 | 2/2010 | Pratt et al. |
| 2010/0039393 A1 | 2/2010 | Pratt et al. |
| 2010/0040152 A1 | 2/2010 | Kortum et al. |
| 2010/0042827 A1 | 2/2010 | Pratt et al. |
| 2010/0050270 A1 | 2/2010 | Pratt et al. |
| 2010/0060569 A1* | 3/2010 | Shamilian ............ 345/156 |
| 2010/0069012 A1 | 3/2010 | Sullivan et al. |
| 2010/0082712 A1 | 4/2010 | Pratt et al. |
| 2010/0088149 A1 | 4/2010 | Sullivan et al. |
| 2010/0104024 A1 | 4/2010 | Sullivan et al. |
| 2010/0113160 A1 | 5/2010 | Belz et al. |
| 2010/0115592 A1 | 5/2010 | Belz et al. |
| 2010/0115607 A1 | 5/2010 | Pratt et al. |
| 2010/0118748 A1 | 5/2010 | Pratt et al. |
| 2010/0121744 A1 | 5/2010 | Belz et al. |
| 2010/0122306 A1 | 5/2010 | Pratt et al. |
| 2010/0124905 A1 | 5/2010 | Pratt et al. |
| 2010/0134338 A1 | 6/2010 | Belz et al. |
| 2010/0138499 A1 | 6/2010 | Belz et al. |
| 2010/0138876 A1 | 6/2010 | Sullivan et al. |
| 2010/0144368 A1 | 6/2010 | Sullivan et al. |
| 2010/0149982 A1 | 6/2010 | Pratt et al. |

(56) References Cited

U.S. PATENT DOCUMENTS

| | | |
|---|---|---|
| 2010/0153764 A1 | 6/2010 | Pratt et al. |
| 2010/0153995 A1 | 6/2010 | Belz et al. |
| 2010/0158533 A1 | 6/2010 | Belz et al. |
| 2010/0161801 A1 | 6/2010 | Belz et al. |
| 2010/0162331 A1 | 6/2010 | Belz et al. |
| 2010/0178869 A1 | 7/2010 | Mauney et al. |
| 2010/0235872 A1 | 9/2010 | Sullivan et al. |
| 2010/0275236 A1 | 10/2010 | Kortum et al. |
| 2010/0275237 A1 | 10/2010 | Pratt et al. |
| 2010/0289685 A1 | 11/2010 | Pratt et al. |
| 2010/0289954 A1 | 11/2010 | Sullivan et al. |
| 2010/0299693 A1 | 11/2010 | Sullivan et al. |
| 2010/0302057 A1 | 12/2010 | Pratt et al. |
| 2010/0302058 A1 | 12/2010 | Belz et al. |
| 2010/0302357 A1* | 12/2010 | Hsu et al. .................. 348/77 |
| 2011/0012710 A1 | 1/2011 | Sullivan et al. |
| 2011/0037574 A1 | 2/2011 | Pratt et al. |
| 2011/0037611 A1 | 2/2011 | Van Vleck et al. |
| 2011/0037637 A1 | 2/2011 | Van Vleck et al. |
| 2011/0075727 A1 | 3/2011 | Van Vleck et al. |
| 2011/0090085 A1 | 4/2011 | Belz et al. |
| 2011/0093876 A1 | 4/2011 | Belz et al. |
| 2011/0093908 A1 | 4/2011 | Van Vleck et al. |
| 2011/0109490 A1 | 5/2011 | Belz et al. |
| 2011/0113459 A1 | 5/2011 | Crowe et al. |
| 2011/0114716 A1 | 5/2011 | Pratt et al. |
| 2011/0115664 A1 | 5/2011 | Belz et al. |
| 2011/0124316 A1 | 5/2011 | Mauney et al. |
| 2011/0131605 A1 | 6/2011 | Pratt et al. |
| 2011/0159861 A1 | 6/2011 | Pratt et al. |
| 2011/0161423 A1 | 6/2011 | Pratt et al. |

* cited by examiner

GESTURE-INITIATED REMOTE CONTROL PROGRAMMING

BACKGROUND

1. Field of the Disclosure

The present disclosure relates to remote control and, more particularly, to gesture-initiated programming of a remote control.

2. Description of the Related Art

Remote control devices provide convenient operation of equipment from a distance. Many consumer electronic devices are equipped with remote control (RC) features. A universal remote control (URC), which may be configured to control different pieces of equipment, may often be difficult to reconfigure and reprogram.

DESCRIPTION OF THE EXEMPLARY EMBODIMENTS

Figure 1:
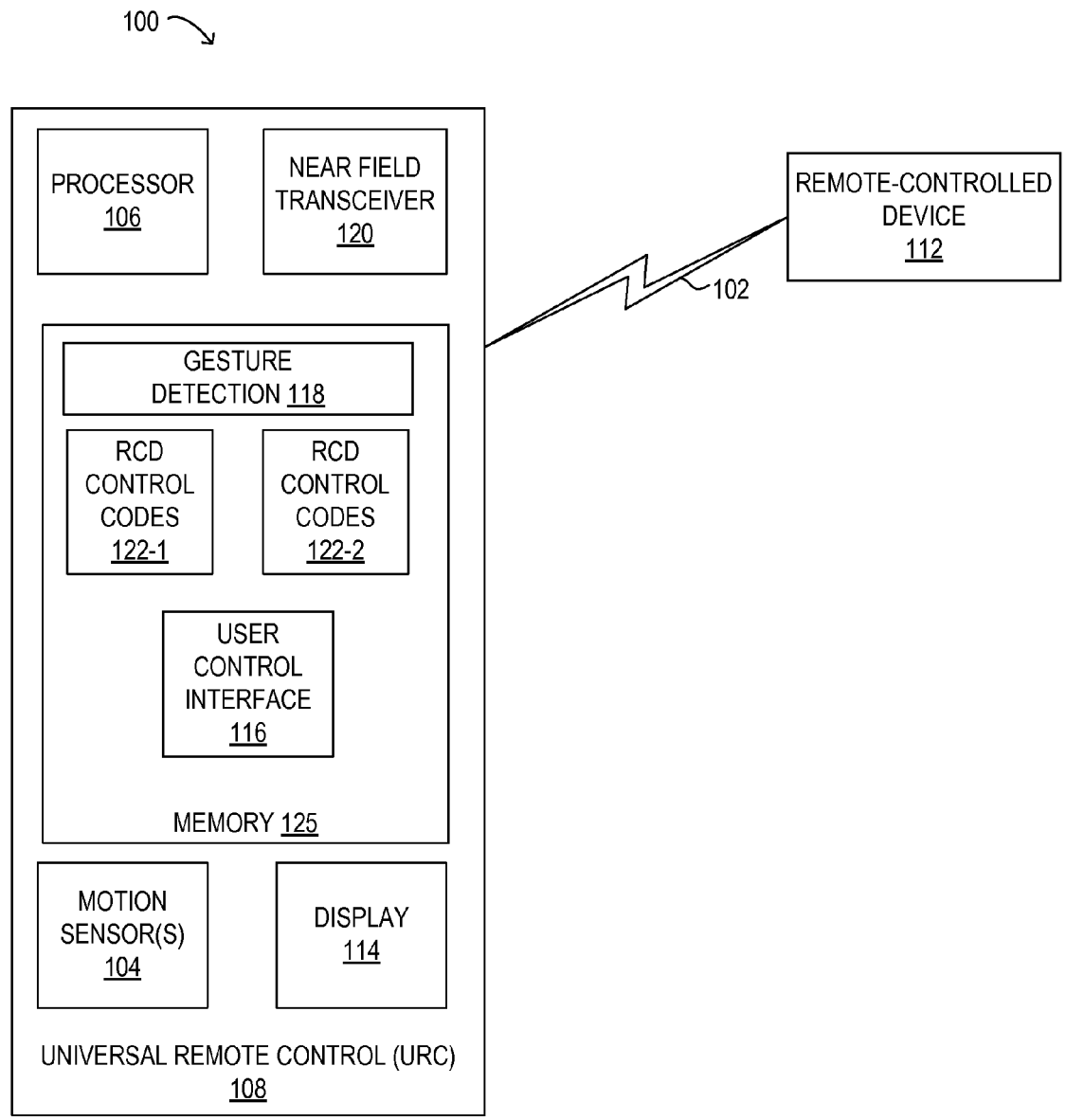
FIG. 1 is a block diagram of selected elements of an embodiment of a remote control system.

In one aspect, a disclosed method for configuring a URC includes detecting a gesture motion of the URC, and in response thereto, establishing a wireless communication link with a remote-controlled device. The method may further include receiving, via the wireless communication link, device information from the remote-controlled device. Based on the device information, the method may further include programming the URC to control the remote-controlled device, and storing the device information in the URC.

In certain embodiments, responsive to displaying at least a portion of the device information on a display device of the URC, the method may further include receiving user input to select the remote-controlled device for said programming. The gesture motion may include the URC traversing a pre-defined spatial path. The gesture motion may include an oscillating motion. The method operation of establishing the wireless link may include establishing a near field communication link in substantial compliance with at least one of the following standards: IEEE 802.15.4, IEEE 802.11, and IEEE 802.15.1. Device information for a plurality of remote-controlled devices may be displayed.

In particular embodiments, the method operation of establishing a connection with a remote-controlled device may further include signaling the remote-controlled device to initiate programming of the URC. The device information may include programming codes for enabling the URC to control the remote-controlled device and/or identifying information for the remote-controlled device.

In various embodiments, responsive to user input, the method may still further include sending a remote control message to the remote-controlled device, the remote control message including an instruction executable by the remote-controlled device.

In another aspect, a disclosed URC includes a processor, a motion sensor, a near field transceiver, and memory media accessible to the processor. The memory media may include instructions executable by the processor to, responsive to the motion sensor detecting a gesture motion, receive device identifying information from at least one remote-controlled device available for programming the URC. The memory media may further include processor instructions executable to, responsive to user input selecting an available remote-controlled device, signal the remote-controlled device to send device programming information to the URC, and receive, via the near field transceiver, the device programming information from the remote-controlled device. The memory media may yet further include processor instructions executable to, responsive to receiving the device programming information, program the URC to control the remote-controlled device.

In particular embodiments, the URC may further include a display device controlled by the processor, along with processor instructions executable to display an indication of the at least one available remote-controlled devices using the display device.

In certain embodiments, the URC may further include a user control interface configured to receive user input, and processor instructions executable to select, based on the user control interface, an available remote-controlled device for programming the URC to control. The user control interface may be a touch interface responsive to tactile user input. The user control interface may be an audio interface responsive to user speech input. The processor instructions to identify at least one remote-controlled device may further include processor instructions executable to broadcast, via the near field transceiver, a remote-controlled device query for available remote-controlled devices. Based on receiving a response to the query, the processor instructions may further be executable to identify at least one available remote-controlled device. The near field transceiver may be an infrared (IR) or a near field radio-frequency (RF) wireless interface.

In a further aspect, a disclosed computer-readable memory media includes executable instructions for configuring a URC. The instructions may be executable to respond to sensing a gesture motion of the URC by wirelessly detecting remote-controlled devices in a vicinity of the URC available for programming the URC, select one of the detected available remote-controlled devices, and signal the selected remote-controlled device to initiate programming of the URC and to send programming codes to the URC. The instructions may further be executable to receive the programming codes from the remote-controlled device, and program the URC to control the remote-controlled device, using the programming codes. The instructions to detect remote-controlled devices may further include instructions executable to send a wireless identification message for remote-controlled devices. Based on a received response to the wireless identification message, the instructions may further be executable to identify the available remote-controlled devices in the vicinity. A determination may be made that no available remote-controlled devices may be detected when no response to the wireless identification message is received within a pre-determined time. In certain embodiments, the memory media may include instructions executable to display an indication of the available remote-controlled devices in the vicinity.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Referring now to FIG. 1, a block diagram of selected elements of an embodiment of remote-controlled system 100 are depicted. System 100 illustrates devices, interfaces and information that may be processed to enable URC 108 to control remote-controlled device 112. In system 100, remote-controlled device 112 represents any of a number of different types of devices that are remote-controlled, such as media players, televisions, or client-premises equipment (CPE) for multimedia content distribution networks (MCDNs), among others. As used herein, a "gesture" or "gesture motion" or "gesture command" refers to a particular motion, or sequences of motions, imparted to an RC by a user for the purpose of providing user input to the RC. The gesture motion may be a translation or a rotation, or a combination thereof, in 2- or 3-dimensional space. Specific gesture motions may be defined and assigned to predetermined commands or functions. As will be described in detail herein, URC 108 may be configured to detect a gesture motion for initiating programming of URC 108 to control remote-controlled device 112. URC 108 may then receive device information, such as identifying information and programming information, from remote-controlled device 112. After receiving the device information, URC 108 may be programmed to control remote-controlled device 112 via wireless communication link 102. Upon receiving command data from URC 108, remote-controlled device 112 may execute a remote control function corresponding to the remote control command. In this manner, a user of remote-controlled system 100 may be provided a simplified, yet flexible interface for configuring URC 108 to control and operate remote-controlled device 112.

In FIG. 1, URC 108 is depicted communicating with remote-controlled device 112 via wireless communication link 102. In other embodiments, wireless communication link 102 may be replaced by a mechanically connected interface, or some combination of different interfaces (not shown in FIG. 1).

As shown in FIG. 1, URC 108, which may be a hand-held and manually operated device, includes numerous elements, and may include additional elements (not shown in FIG. 1) in various embodiments. URC 108 is shown including processor 106, near field transceiver 120, memory 125, motion sensor(s) 104, and display 114. Memory 125 is depicted in FIG. 1 including gesture detection 118, RCD control codes 122-1, RCD control codes 122-2, and user control interface 116. Accordingly, URC 108 may comprise elements configured to function as an embodiment of an electronic device capable of executing program instructions. URC 108 may further include at least one shared bus (not shown in FIG. 1) for interconnectivity among internal elements, such as those depicted in FIG. 1.

Processor 106 may represent at least one processing unit and may further include internal memory, such as a cache for storing processor executable instructions. In certain embodiments, processor 106 serves as a main controller for URC 108. In various embodiments, processor 106 is operable to perform remote control operations, including gesture detection and processing operations, as described herein.

In FIG. 1, near field transceiver 120 may represent a communications transceiver providing an interface for any of a number of communication links. In certain embodiments, near field transceiver 120 supports wireless communication links, such as IR, RF, and audio, among others. Near field transceiver 120 may further support mechanically connected communication links to URCs, such as galvanically wired connections, connections to external antennas, etc., and may accordingly include a physical adapter or receptacle for receiving such connections. In one embodiment, near field transceiver 120 transforms an instruction for operating remote-controlled device 112 into a signal sent via wireless communication link 102. It is noted that near field transceiver 120 may be a bidirectional interface, such that responses, such as commands, information, or acknowledgements, may be received from remote-controlled device 112 via wireless communication link 102. In one embodiment, a message may be sent to remote-controlled device 112 and an acknowledgement of the message may be received from remote-controlled device 112, such that the message is sent and the acknowledgment is received via near field transceiver 120. The message may include command data, as will be described below.

Also in FIG. 1, memory 125 encompasses persistent and volatile media, fixed and removable media, magnetic and semiconductor media, or a combination thereof. Memory 125 is operable to store instructions, data, or both. Memory 125 as shown includes data, which may be in the form of sets or sequences of executable instructions, namely, gesture detection 118. Gesture detection 118 may include processor executable instructions to detect and interpret gesture motions as user input. For example, gesture detection, in conjunction with motion sensor(s) 104, as will be described below, may be configured to detect URC 108 traversing a pre-defined spatial path, and interpret this as user input. As will be described herein, the user input may be interpreted by gesture detection 118 as an indication to begin programming URC 108 to control a new remote-controlled device.

Figure 4:
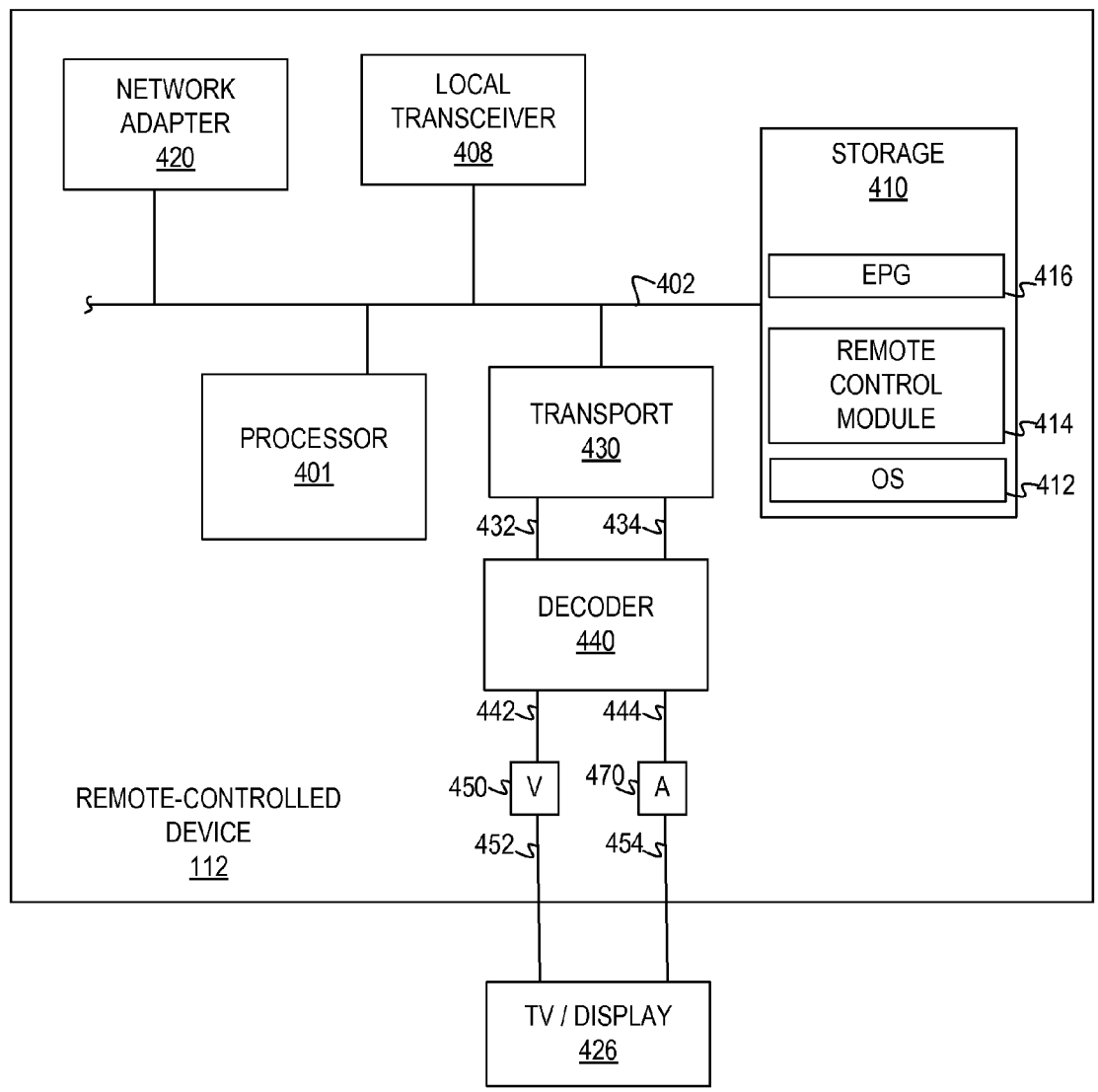
FIG. 4 is a block diagram of selected elements of an embodiment of a remote-controlled device.

Memory 125 is further shown including RCD control codes 122-1 and 122-2, representing respective programming information for additional remote-controlled devices (not shown in FIG. 1; see also FIG. 4). URC 108 as depicted in FIG. 1 is configured to control two remote-controlled devices, while being configured to initiate programming to control remote-controlled device 112, which may be a new remote-controlled device. Accordingly, URC 108 may be configured to control a plurality of remote-controlled devices.

Memory 125 is still further depicted in FIG. 1 including user control interface 116, representing functionality to control a variety of input control elements integrated into URC 108. User control interface 116 may support the use of buttons, sliders, switches or other types of electromechanical input devices (not shown in FIG. 1), or virtual implementations thereof. For example, user control interface 116 may support power control elements for powering URC 108 on or off. User control interface 116 may additionally support control elements that generate remote control commands executable by remote-controlled device 112, such as, but not limited to, info, play, pause, guide, purchase, browse, etc. In certain embodiments, user control interface 116 may include control elements associated with a remote control context (not shown in FIG. 1) executing on URC 108 and/or remote-controlled device 112. The remote control context may be in the form of a displayed menu structure that is controlled by user control interface 116. In particular, user control interface 116 may support functionality to select an activated item in the remote control context.

URC 108, as depicted in FIG. 1, includes motion sensor(s) 104, which may be mechanically integrated into URC 108. Motion sensor(s) 104 may represent devices configured to detect linear translations, rotational translations, linear acceleration, rotational acceleration, or a combination thereof. For example, motion sensor(s) 104 may be configured to determine a spatial acceleration involving multiple axes of motion simultaneously. Motion sensor(s) 104 may include microelectromechanical systems (MEMS) or MEMS components, such as accelerometers, gyroscopes, or other types of motion sensors. It is noted that motion sensor(s) 104 may represent sensors configured to detect translation or rotation of URC 108 in multiple dimensions simultaneously.

In FIG. 1, URC 108 is shown including display 114 which may represent a display device implemented as a liquid crystal display screen, a computer monitor, a television, a touch screen device, or the like. The display element may comply with a display standard for the corresponding type of display. Standards for computer monitors include analog standards such as video graphics array (VGA), extended graphics array (XGA), etc., or digital standards such as digital visual interface (DVI) or high-definition multimedia interface (HDMI), among others. A television display may comply with standards such as National Television System Committee (NTSC), Phase Alternating Line (PAL), or another suitable standard. It is noted that display 114 may be configured to display a list of remote-controlled devices detected in a vicinity of URC 108. Display 114 may further enable user input for selecting one of the displayed remote-controlled device for programming URC 108 to control, as will be described in detail herein.

In operation, URC 108, after power on, may be enabled to detect a gesture motion, such as a pre-determined spatial path. The detected gesture motion may be interpreted as a user command or signal to initiate a programming mode of URC 108. In other embodiments, a programming mode may be initiated with additional or alternate user input. Then, URC 108 may establish a wireless communication link with remote-controlled device 112. In certain embodiments, URC 108 may broadcast, using near field transceiver 120, a query for any remote-controlled devices in a vicinity of URC 108. The query may be a beacon or a wireless identification message to which a number of remote-controlled devices may respond. The extent of the vicinity may be determined by the field strength, frequency, or other attribute of near field transceiver 120. Remote-controlled devices responding to the query may be considered "available" for programming URC 108 to control. The available remote-controlled devices may be displayed by URC 108 and user input may be received for selecting at least one of the available remote-controlled device for programming, such as remote-controlled device 112. Remote-controlled device 112 may then send programming codes to URC 108, which may store the programming codes as RCD control codes, similar to RCD control codes 122-1 and 122-2, in memory 125. URC 108 may then be configured to control remote-controlled device 112, and may accordingly send, via wireless communication link 102, commands to remote-controlled device 112, which remote-controlled device 112 may receive and execute. The commands may correspond to the RCD control codes (not shown in FIG. 1) for remote-controlled device 112 stored in memory 125.

Figure 2:
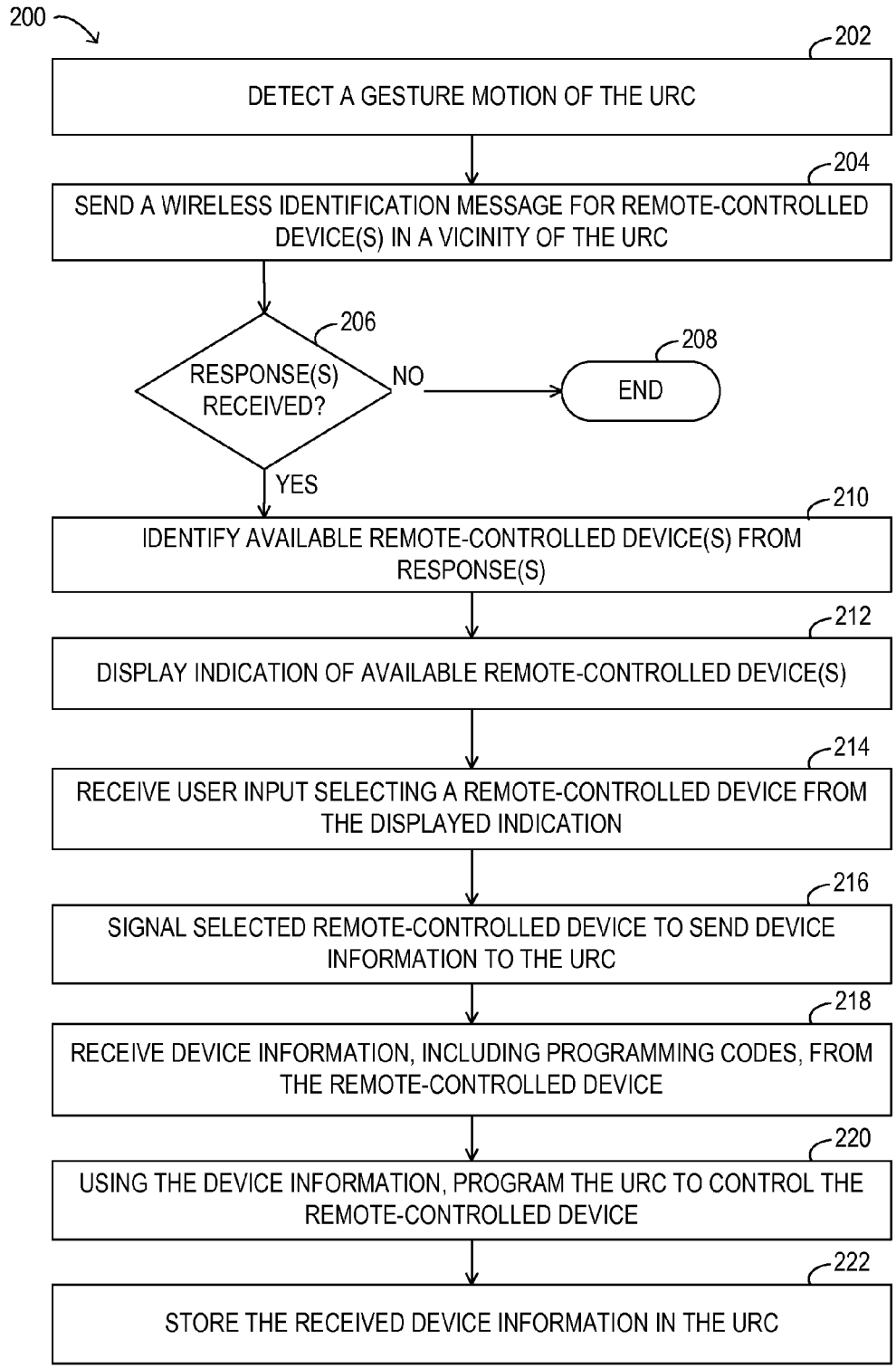
FIG. 2 illustrates an embodiment of a method for operating a URC.

Turning now to FIG. 2, an embodiment of method 200 for configuring a URC is illustrated. In one embodiment, method 200 is performed at least in part by gesture detection 118 executing on URC 108 (see FIG. 1). Memory 125 (see FIG. 1) may further include additional executable code for performing method 200. It is noted that certain operations described in method 200 may be optional or may be rearranged in different embodiments.

Method 200 may begin by detecting a gesture motion of the URC (operation 202). The gesture motion may be detected using motion sensor(s) 104 (see FIG. 1). The gesture motion may serve as a signal to initiate a programming mode or function on the URC. A wireless identification message may be sent for remote-controlled device(s) in a vicinity of the URC (operation 204). It is noted that certain remote-controlled device(s) may be configured to receive the identification message, and respond accordingly.

Method 200 may proceed by determining whether one or more response(s) were received to the wireless identification message (operation 206). If the result of the determination in operation 206 is NO, then no remote-controlled devices (or new remote-controlled devices) were identified, and method 200 may end (operation 208). In certain embodiments, no available remote-controlled devices are detected when no response to the wireless identification message is received within a pre-determined time. If the result of the determination in operation 206 is YES, then at least one response from a remote-controlled device was detected. The available remote-controlled device(s) may be identified from the response(s) (operation 210). The response(s) may include device identification information for the responding remote-controlled device(s).

An indication of the available remote-controlled device(s) may be displayed (operation 212). For example, a list of available remote-controlled device(s) may be displayed on display 114 (see FIG. 1). User input selecting a remote-controlled device from the displayed indication may be received (operation 214). The selected remote-controlled device may be signaled to send device information to the URC (operation 216). Alternatively, the device information may be provided to the URC during the initial response by the remote-controlled device. The device information, including programming codes, may be received from the remote-controlled device (operation 218). Using the device information, the URC may be programmed to control the remote-controlled device (operation 220). The remote-controlled device may represent a new remote-controlled device, which the URC is now configured to control. The received device information may be stored in the URC (operation 222). The device information may be stored as RCD control codes 122 in memory 125 of URC 108 (see FIG. 1).

Figure 3:
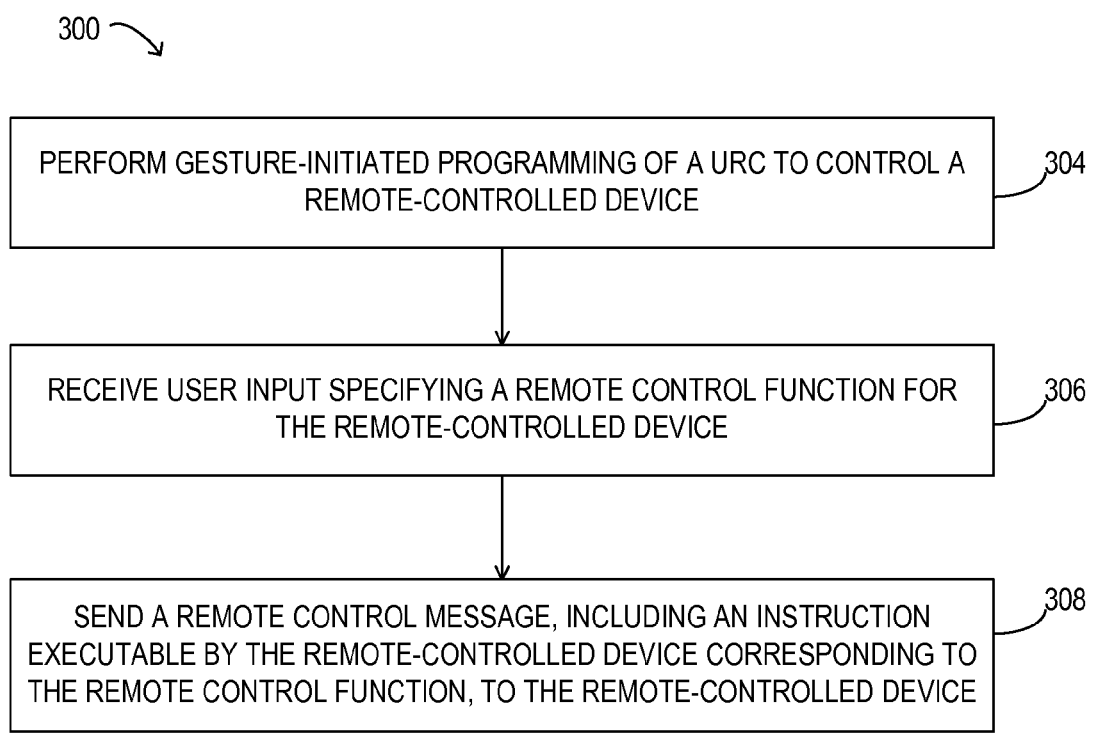
FIG. 3 illustrates an embodiment of a method for operating a URC.

Turning now to FIG. 3, an embodiment of method 300 for operating a URC is illustrated. In one embodiment, method 300 is performed by URC 108 (see FIG. 1) in conjunction with user input. It is noted that certain operations described in method 300 may be optional or may be rearranged in different embodiments.

Method 300 may begin by performing gesture-initiated programming of a URC to control a remote-controlled device (operation 304) In one embodiment, operation 304 corresponds to method 200 (see FIG. 2). User input specifying a remote control function for the remote-controlled device may be received (operation 306). The user input may be received in response to displaying user control interface 116 on display 114. A remote control message, including an instruction executable by the remote-controlled device, may be sent to the remote-controlled device (operation 308). The instruction, or command, may be sent by near field transceiver 120 via wireless communication link 102 to remote-controlled device 112. Remote-controlled device 112 may then respond by executing the instruction.

Referring now to FIG. 4, a block diagram illustrating selected elements of an embodiment of remote-controlled device 112 is presented. As noted previously, remote-controlled device 112 may represent any of a number of different types of devices that are remote-controlled, such as media players, televisions, or CPE for MCDNs, among others. In FIG. 4, remote-controlled device 112 is shown as a functional component along with display 426, independent of any physical implementation, and may be any combination of elements of remote-controlled device 112 and display 426.

In the embodiment depicted in FIG. 4, remote-controlled device 112 includes processor 401 coupled via shared bus 402 to storage media collectively identified as storage 410. Remote-controlled device 112, as depicted in FIG. 4, further includes network adapter 420 that may interface remote-controlled device 112 to a local area network (LAN) through which remote-controlled device 112 may receive and send multimedia content (not shown in FIG. 4). Network adapter 420 may further enable connectivity to a wide area network (WAN) for receiving and sending multimedia content via an access network (not shown in FIG. 4).

In embodiments suitable for use in Internet protocol (IP) based content delivery networks, remote-controlled device 112, as depicted in FIG. 4, may include transport unit 430 that assembles the payloads from a sequence or set of network packets into a stream of multimedia content. In coaxial based access networks, content may be delivered as a stream that is not packet based and it may not be necessary in these embodiments to include transport unit 430. In a coaxial implementation, however, tuning resources (not explicitly depicted in FIG. 4) may be required to "filter" desired content from other content that is delivered over the coaxial medium simultaneously and these tuners may be provided in remote-controlled device 112. The stream of multimedia content received by transport unit 430 may include audio information and video information and transport unit 430 may parse or segregate the two to generate video stream 432 and audio stream 434 as shown.

Video and audio streams 432 and 434, as output from transport unit 430, may include audio or video information that is compressed, encrypted, or both. A decoder unit 440 is shown as receiving video and audio streams 432 and 434 and generating native format video and audio streams 442 and 444. Decoder 440 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 440 may employ any of various audio decoding algorithms including Dolby® Digital, Digital Theatre System (DTS) Coherent Acoustics, and Windows Media Audio (WMA).

The native format video and audio streams 442 and 444 as shown in FIG. 4 may be processed by encoders/digital-to-analog converters (encoders/DACs) 450 and 470 respectively to produce analog video and audio signals 452 and 454 in a format compliant with display 426, which itself may not be a part of remote-controlled device 112. Display 426 may comply with NTSC, PAL or any other suitable television standard.

Storage 410 encompasses persistent and volatile media, fixed and removable media, and magnetic and semiconductor media. Storage 410 is operable to store instructions, data, or both. Storage 410 as shown may include sets or sequences of instructions, namely, an operating system 412, a remote control application program identified as remote control module 414, and electronic programming guide (EPG) 416. Operating system 412 may be a UNIX or UNIX-like operating system, a Windows® family operating system, or another suitable operating system. In some embodiments, storage 410 is configured to store and execute instructions provided as services by an application server via the WAN (not shown in FIG. 4).

EPG 416 represents a guide to multimedia content available for viewing using remote-controlled device 112, and may be shown to the user as an element of the user interface. The user interface may include a plurality of menu items arranged according to one or more menu layouts, which enable a user to operate remote-controlled device 112. The user may operate the user interface, including EPG 416, using URC 108 (see FIG. 1) in conjunction with remote control module 414. In some embodiments, EPG 416 may include an implementation of a remote control context, as described above.

Local transceiver 408 represents an interface of remote-controlled device 112 for communicating with external devices, such as URC 108 (see FIG. 1), or another remote control device. Local transceiver 408 may provide a mechanical interface for coupling to an external device, such as a plug, socket, or other proximal adapter. In some cases, local transceiver 408 is a wireless transceiver, configured to send and receive IR or RF or other signals. Local transceiver 408 may be accessed by remote control module 414 for providing remote control functionality.

Figure 5:
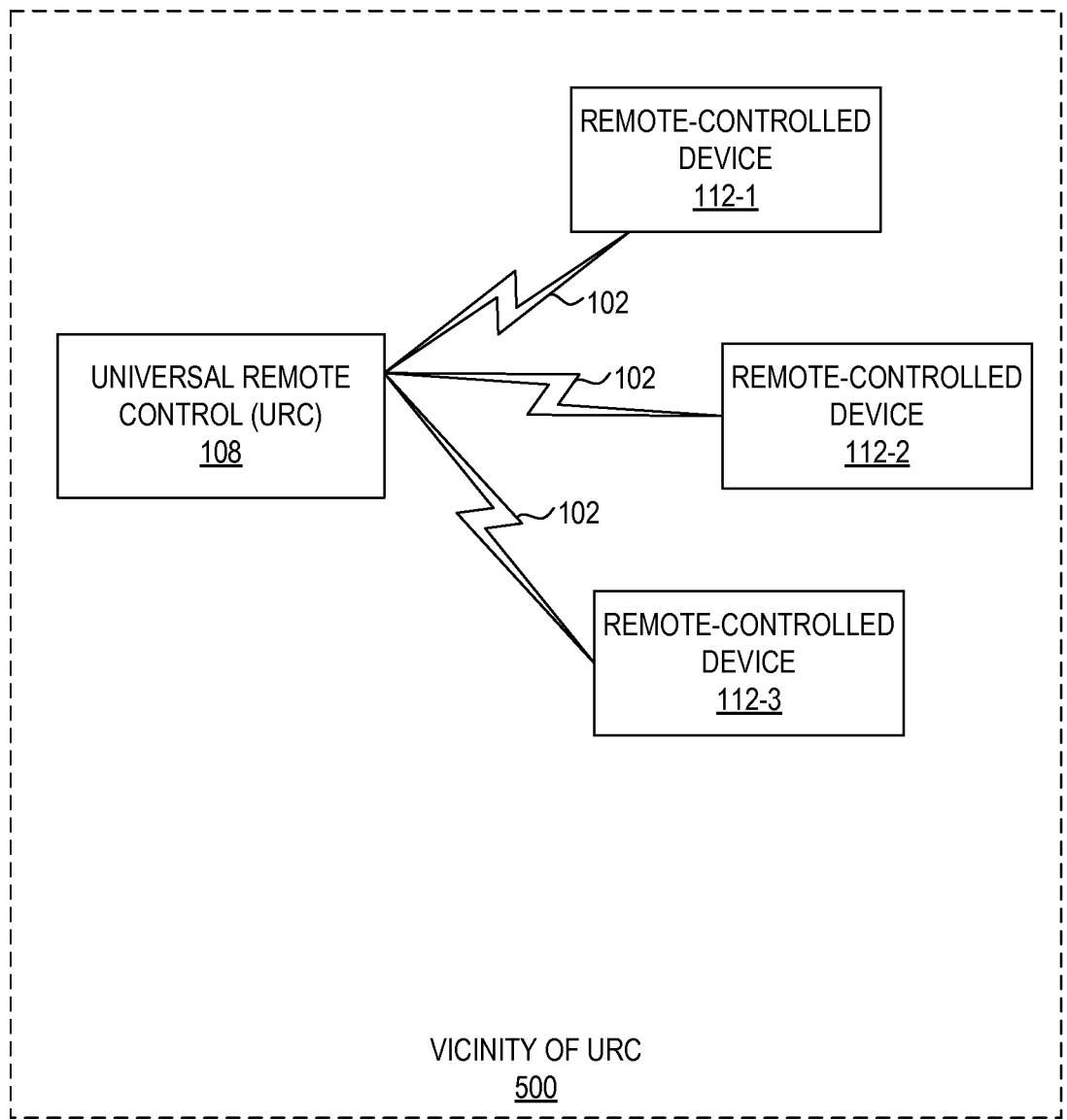
FIG. 5 is a block diagram of selected elements of an embodiment of a remote control system.

Turning now to FIG. 5, vicinity 500 of URC 108 is depicted. Vicinity 500 may represent an area serviceable by near field transceiver 120 (see FIG. 1). URC 108 is shown in FIG. 5 configured to control three remote-controlled devices 112-1, 112-2, and 112-3, via wireless communication link 102. In certain embodiments, remote-controlled device 112-3 in FIG. 5 may correspond to newly configured remote-controlled device 112, as shown in FIG. 1. As described herein, URC 108 may be configured to be programmed to control a remote-controlled device introduced into vicinity 500. Wireless communication link 102 may be in substantial compliance with at least one of the following standards: IEEE 802.15.4 (ZigBee), IEEE 802.11 (WiFi), and IEEE 802.15.1 (Bluetooth).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for configuring a universal remote control, the method comprising:
   responsive to detecting a programming gesture motion of the universal remote control, initiating a remote control programming sequence including:
      broadcasting, by a wireless transceiver, a wireless device identification request;
      responsive to receiving, with the wireless transceiver, a wireless response to the device identification request from a remote-controlled device, requesting the remote controlled device to send device information, including remote control codes, for the remote controlled device;
      responsive to receiving the device information, programming the universal remote control to support the remote control codes; and
      storing the device information in the universal remote control;
   responsive to receiving user input associated with a first remote control code, sending the first remote control command to the remote controlled device;

displaying, on a display device of the universal remote control, a list of available remote controlled devices; and receiving user input to select one of the plurality of available remote-controlled devices for programming.

2. The method of claim 1, wherein the programming gesture motion includes a pre-defined spatial path.

3. The method of claim 1, wherein the programming gesture motion includes an oscillating motion.

4. The method of claim 1, wherein the wireless transceiver complies with a near field communication link standard selected from: IEEE 802.15.4, IEEE 802.11, and IEEE 802.15.1.

5. The method of claim 1, wherein the available remote controlled devices comprise remote controlled devices from which responses to the device identification request were received.

6. The method of claim 1, wherein the wireless transceiver comprises an infrared transceiver.

7. A universal remote control, comprising:
a processor;
a motion sensor;
a near field transceiver; and
memory media, accessible to the processor, including processor executable instructions that, when executed by the processor, cause the processor to perform operations comprising:
responsive to detecting a programming gesture motion of the universal remote control, initiating a remote control programming sequence comprising operations including:
broadcasting, by a wireless transceiver, a wireless device identification request;
responsive to receiving, with the wireless transceiver, a wireless response to the device identification request from a remote-controlled device, requesting the remote controlled device to send device information, including remote control codes, for the remote controlled device;
responsive to receiving the device information, programming the universal remote control to support the remote control codes; and
storing the device information in the universal remote control;
responsive to receiving user input associated with a first remote control code, sending the first remote control command to the remote controlled device;
displaying, on a display device of the universal remote control, a list of available remote controlled devices; and
receiving user input to select one of the plurality of available remote-controlled devices for programming.

8. The universal remote control of claim 7, wherein the programming gesture motion includes a pre-defined spatial path.

9. The universal remote control of claim 7, wherein the programming gesture motion includes an oscillating motion.

10. The universal remote control of claim 7, wherein the wireless transceiver complies with a near field communication link standards selected from: IEEE 802.15.4, IEEE 802.11, and IEEE 802.15.1.

11. The universal remote control of claim 7, wherein the available remote controlled devices comprise remote controlled devices from which responses to the device identification request were received.

12. The universal remote control of claim 7, wherein the wireless transceiver comprises an infrared transceiver.

13. A non-transitory computer-readable memory medium, including processor executable instructions that, when executed by a processor, cause the processor to perform operations comprising:
responsive to detecting a programming gesture motion of the universal remote control, initiating a remote control programming sequence comprising operations including:
broadcasting, by a wireless transceiver, a wireless device identification request;
responsive to receiving, with the wireless transceiver, a wireless response to the device identification request from a remote-controlled device, requesting the remote controlled device to send device information, including remote control codes, for the remote controlled device;
responsive to receiving the device information, programming the universal remote control to support the remote control codes;
storing the device information in the universal remote control;
responsive to receiving user input associated with a first remote control code, sending the first remote control command to the remote controlled device;
displaying, on a display device of the universal remote control, a list of available remote controlled devices; and
receiving user input to select one of the plurality of available remote-controlled devices for programming.

14. The non-transitory memory medium of claim 13, wherein the programming gesture motion includes a pre-defined spatial path.

15. The non-transitory memory medium of claim 13, wherein the programming gesture motion includes an oscillating motion.

16. The non-transitory memory medium of claim 13, wherein the wireless transceiver complies with a near field communication link standards selected from: IEEE 802.15.4, IEEE 802.11, and IEEE 802.15.1.

17. The non-transitory memory medium of claim 13, wherein the wireless transceiver comprises an infrared transceiver.

* * * * *